United States Patent [19]
Fitelson et al.

[11] Patent Number: 4,703,471
[45] Date of Patent: Oct. 27, 1987

[54] MONOLITHICALLY INTEGRATED ELECTRO-OPTICAL MULTIPLEXER/DEMULTIPLEXER

[75] Inventors: Michael M. Fitelson, Dewitt; Stephen Wanuga; Jack B. Williams, both of Liverpool, all of N.Y.

[73] Assignee: General Electric Company, Syracuse, N.Y.

[21] Appl. No.: 688,375

[22] Filed: Jan. 2, 1985

[51] Int. Cl.$^4$ ............................................. H04B 9/00
[52] U.S. Cl. .......................................... 370/1; 370/4; 455/606; 455/608
[58] Field of Search ...................... 455/619, 608, 606; 370/1, 4; 357/30, 30 I, 19, 30 R

[56] References Cited

U.S. PATENT DOCUMENTS 4,475,212  10/1984  McLean et al. .................... 455/608
4,606,023  8/1986   Dragoo ............................... 455/608

FOREIGN PATENT DOCUMENTS 0012450  1/1983  Japan ..................................... 370/1
0012451  1/1983  Japan ..................................... 370/1

OTHER PUBLICATIONS

Lombaerde–"Fiber-Optic Multiplexer"–Electronics–Mar. 24, 1982, pp. 125-127.
Bar-Chaim et al.–Integrated Optoelectronics–IEEE Spectrum, May 1982, pp. 38-45.
Fowler et al.; *IBM Technical Disclosure Bulletin;* "Tunable Far-Infrared Photodetector"; vol. 13; Jun. 1970; p. 67.
Bertin; *IBM Technical Disclosure Bulletin;* "Multi-Input Voltage/Light Sensitive Structure"; vol. 16; No. 1; Jun. 1973; p. 281.

Primary Examiner—Joseph A. Orsino, Jr.
Attorney, Agent, or Firm—Richard V. Lang; Carl W. Baker; Fred Jacob

[57] ABSTRACT

A monolithically integrated circuit is described for multiplexing parallel electrical data into a serial bit stream for transmission by fiber optics to a remote utilization apparatus and for demultiplexing a serial bit stream received from a fiber optics transmission path from a remote source. The integrated circuit uses a separate fiber for transmission and for reception, and in the transmission mode, encodes the data, which is clocked by on chip clocking into a self-clocking three-level code. The integrated circuit utilizes GaAs as the substrate material and is capable of transmitting data at bit rates in excess of ½ gHz.

1 Claim, 5 Drawing Figures

MONOLITHICALLY INTEGRATED ELECTRO-OPTICAL MULTIPLEXER/DEMULTIPLEXER

BACKGROUND OF THE INVENTION

1. Field of the Invention

The invention relates to the multiplexing of data from a plurality of paths into a single serial bit stream and to the demultiplexing of data from a serial bit stream into a plurality of separate paths. The invention further relates to high speed ($\geq \frac{1}{2}$ gHz bit rate) data transmission between separated complex data processors and more particularly to efficient data transmission between discrete integrated circuits using optical transmission paths.

2. Description of the Prior Art

The means for transmission of data streams between discrete information processors now frequently sets limits on the degree of complexity that may be achieved in a single monolithic device. An integrated circuit which operates at 32 bit accuracy may require 32 terminals for parallel input connection and a like 32 terminals for parallel output connection. Terminals which can only be sited at 0.010 inch centers, thus quickly consume a large part of the available perimeter of an integrated circuit. If the data processing is more complex, as for instance, the conjugation of a 64-point complex matrix, parallel input connections alone would require 4096 sites. Such a pin count would be impractical for even the current large (0.500×0.500 inches) chips.

The solution to the data transmission issue posed above is to increase the serialization of the data and to increase the data transmission rate per channel. The solution for megahertz transmission rates has been to use ever higher frequency electrical transmission lines. Flying leads, which are popular and low "tech", lose efficiency at quite modest frequencies, and as suggested earlier, customarily consume 0.10 inches of chip perimeter per connection.

The demand for greatly increased data rates has led to optical communication paths. An optical fiber carrying coherent light can theoretically carry data at a rate commensurate with the optical frequency. Thus the optical fiber offers the possibility of increasing the data transmission rates by more than five orders of magnitude over an electrical transmission line. In practical optical transmission paths, modulated optical carriers have achieved data modulation bandwidths at fractional (i.e. $\frac{1}{2}$) gHz bit rates and above. Thus it is practical to transmit 32 channels each of 15 mHz bandwidth, on a single optical fiber. In this example a 32 to 1 reduction in connection pins may be achieved by multiplexing the 32 channels into a single serial data stream and then converting the electrical signal to an optical format for transmission by an optical fiber.

The use of optical fibers for high bit-rate data transmission is well known. The present invention addresses the problem of high bit-rate data transmission in the context of the requirements of monolithically integrated circuit structures. In this context, it addresses the problem of multiplexing a large number of separate sources of data in an electrical format into a serial optical data stream, and the reverse process of demultiplexing a serial optical data stream into a large number of electrical paths.

SUMMARY OF THE INVENTION

Accordingly, it is an object of the invention to provide a novel means for multiplexing parallel electrical signals into a serial optical data stream and for demultiplexing a serial optical data stream into a plurality of electrical paths.

It is another object of the invention to provide a novel integrated circuit for multiplexing and demultiplexing signals using an optical path for serial high bit-rate data transmission external to the integrated circuit.

It is still another object of the invention to provide in a single integrated circuit for multiplexing/demultiplexing data, using an optical transmission path, improved means for clocking the data.

These and other objects of the invention are achieved in a novel integrated circuit for electrooptical multiplex/demultiplex operation. The integrated circuit comprises a substrate of GaAs having a plurality of parallel, electrical, IC input/output terminals; a serial, optical, IC output port for coupling to a first, output, optical fiber; a serial, optical, IC input port for coupling to a second input, optical fiber.

The integrated circuit further comprises an electrical converter—typically a shift register—for binary data having a parallel to serial (multiplex) mode and having a serial to parallel (demultiplex) mode. The shift register has parallel input/output terminals for data exchange in both modes, a serial output terminal, for transmission of a serial data stream in the multiplex mode, and a serial input terminal for reception of a serial data stream in the demultiplex mode. An electrical encoder is provided for converting the serial output data stream of the converter from a binary to a three level coded format.

The integrated circuit further comprises a diode laser forming the optical output port of the IC, which is amplitude modulated in a three-level code to transmit a self clocking serial optical data stream; and an electrical clocking oscillator coupled to the converter and to the encoder to clock the optical output of the integrated circuit. In the multiplex mode, the encoder, laser and clocking oscillator are operative.

The integrated circuit further comprises an optical detector, forming the optical input port of the integrated circuit, which converts a received, three-level coded optical data stream to a like coded serial electrical data stream; and an electrical decoder for converting the detected three-level coded data stream to a binary format and for recovering the clocking accompanying the received optical data stream.

The optical detector and decoder are operative in the demultiplex mode, providing a decoded received serial data stream to the serial input terminal of the converter. The data stream first appears in a parallel format at the parallel electrical input/output terminals of the converter, from which it is coupled to the input/output terminals of the integrated circuits clocked at the clocking rate recovered from the three-level optical data stream.

BRIEF DESCRIPTION OF THE DRAWINGS

The novel and distinctive features of the invention are set forth in the claims of the present application. The invention itself, however, together with further objects and advantages thereof may best be understood by reference to the following description and the accompanying drawings, in which:

DESCRIPTION OF THE PREFERRED EMBODIMENT

Figure 1:
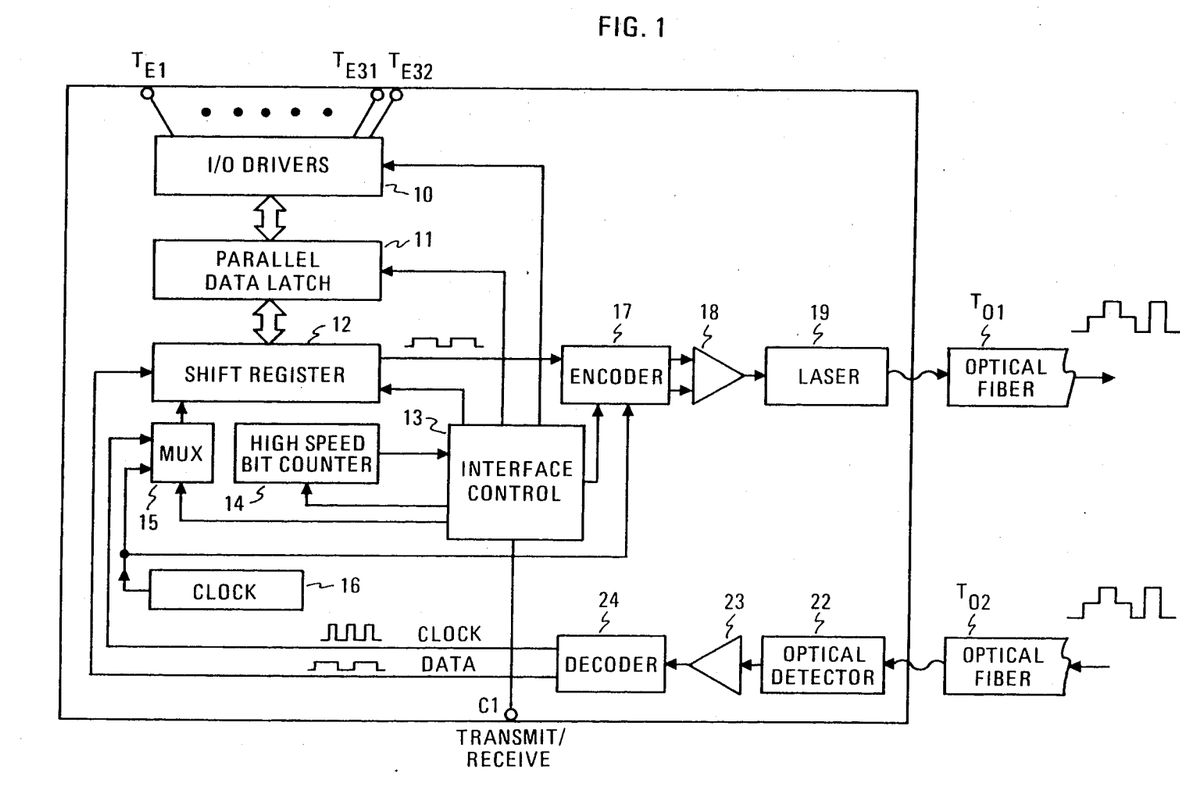
FIG. 1 is a block diagram of the component cells of a novel monolithically integrated circuit for electro-optical multiplex/demultiplex operation at high ($\geq \frac{1}{2}$ gHz) bit rates.

Referring now to FIG. 1, there is shown a novel monolithic digital electro-optical multiplex/demultiplex integrated circuit illustrated at the level of the constituent cells. In the multiplex mode, the integrated circuit is designed to convert a plurality (eg. 32) of wideband (eg. 25 mHz) parallelled electrical input signals having a total bandwidth of $\geq 1$ gHz into a single serial optical output signal. In the demultiplex mode, the integrated circuit is designed to convert a single serial optical input signal of $\geq 1$ gHz bandwidth into a plurality of parallelled electrical output signals.

The foregoing electro-optical multiplex/demultiplex integrated circuit is designed to be fabricated upon a gallium arsenide substrate. The logic may be buffered FET logic. Direct implanted depletion mode or enhancement/depletion mode metal semiconductor field effect transistors (MESFETS) are suitable. Dependent on the process selection and particularly on whether the lithography is projection or direct contact, it may be preferable that the output electro-optical component, (a ridge waveguide diode laser) be fabricated on a different plane from the other components on the common substrate. Metal organic chemical vapor deposition (MOCVD) is a preferred method of processing the devices. Further details covering the processing of the cells of the integrated circuit will be provided as they are individually treated hereinafter.

Returning now to FIG. 1, the integrated circuit may be seen to comprise a cluster of cells 10 to 16 for performing the multiplex/demultiplex function, an encoder 17 for converting data in binary digital format derived in a single serial path from the cell cluster (10–16) to a three-logic-level code, a laser buffer D to A converter 18 for converting the three-logic-levels to three analog levels at sufficiently high power to drive a laser, and the laser 19, which is preferably a ridge waveguide diode laser, providing the optical output of the integrated circuit in a three-(amplitude)-level code. The foregoing cells of the integrated circuit have been enumerated in the order followed by parallel electrical input signals as they are multiplexed into a single serial optical output channel.

The integrated circuit further comprises an optical detector 22 for detecting an optical signal encoded in a three-level code; an amplifier 23 for converting the three-level output of the optical detector to the correct logic levels required for digitally processing the detected signal, a decoder 24, coupled to the output of the amplifier 23, for converting the three-level digital electrical signal to a conventional binary digital format and for recovering the clocking implicitly in the optical signal, and the digital multiplex-demultiplex cell cluster (10–16) which now demultiplexes the serial binary digital electrical input signal into a plurality of binary digital electrical output signals.

The signal and control connections to the multiplex/demultiplex mode conversion means are best illustrated in FIG. 1. The electrical input/output signals pass via the electrical terminals ($T_{E1}$ to $T_{E32}$) at the periphery of the substrate and leading to the parallel electrical terminals of the input/output drivers 10 of digital multiplex/demultiplex cell cluster. Conventionally, because of the relatively low frequencies involved, these conductive paths may be either transmission lines formed by conductive runs on an insulating surface of a chip carrier leading to bonds on the chip substrate, or more conventionally flying leads coupled from the chip carrier to pads on the perimeter of the chip.

The optical output and input signals of the IC pass via separated optical fibres, respectively $T_{O1}$ and $T_{O2}$. The laser 19 produces a three-evel optical output, consistent with three levels of linear LASER operation. The optical output from the laser 19 is coupled to an optical fibre $T_{O1}$. The optical detector 22 is designed to respond to a three-level optical signal, which is the nature of the optical input provided by the optical fibre $T_{O2}$ coupled to the optical input of the detector 22.

The control connections, (e.g. C1), are coupled to the interface controller 13, which superintends the operation of the IC in the multiplex or demultiplex mode, in the transition between modes, and in accommodating word length or data format. In addition to the transmit/receive control C1 illustrated, other controls not illustrated but optiontially present might include a strobe control, a busy signal (during transmission), a mode control (during transmission) and a bit count error indicator (during reception), and an output/enable control (during reception), which are relevant to most chip applications.

The conversion from multiplex to demultiplex operation (which corresponds to conversion from transmission to reception) or vice versa is achieved by the interface controller 13 acting through internal connections to the cell cluster 10–16 and 17. The interface controller 13 is in turn controlled by the control connection C1 at the perimeter of the chip.

The cell cluster 10–16 which performs the multiplex/demultiplex function consists of the following individual cells which are interconnected in the following manner. It comprises the input/output drivers 10 of which there are 32 in parallel, corresponding to the 32 parallel electrical inputs $T_{E1}$ to $T_{E32}$. The connection between the parallel input pads and the driver cell 10 is bidirectional. In the transmit mode the terminals $T_{E1}$ to $T_{E32}$ provided parallel electrical signals to the "input" drivers (10) while in the receive mode the "output" drivers (10) supply parallel electrical signals to the 32 parallel electrical terminals $T_{E1}$ to $T_{E32}$. A 32 stage parallel data latch 11 is bidirectionally connected between the I/O drivers 10 and the shift register 12, the shift register is a 32 stage register, bidirectionally connected by the 32 parallel channels to the latch 11. The 32 parallel bidirectional paths thus exist between the pads $T_{E1}$ and $T_{E32}$ and the 32 individual stages of the shift register 12.

In the transmission mode, parallel electric control data from pads $T_{E1}$ to $T_{E32}$ become serial electrical output data in the multiplex/demultiplex cell cluster. The serial electrical output taken from the right connection of the shift register block is coupled to the encoder 17, as the next step in preparing the serial data signal for optical transmission. During reception, data is supplied from the decoder 24 responding to an optically communicated signal. The decoder data output is coupled to the input of the shift register (shown as the left connection to the shift register block).

The interface controller controls the principal cells of the multiplex/demultiplex cluster by means of connections to the I/O drivers (10), to the parallel data latch 11 and to the shift register 12. In addition, controls are provided to the encoder 17 and to the high speed bit counter 14 which is used to accommodate variable word lengths.

The interface controller 13, controls the application of clocking to the cluster during transmission and reception. During transmission, a clocking oscillator 16 ("clock"), is active, and supplies clocking via the multiplexer 15 under control of the controller to the shift register 12 and to the encoder 17. The clock 16 operates at $\geq 1$ gHz, corresponding to the desired data rate, and establishes the data rate during transmission by clocking the shift register 12 and the encoder 17. During reception, the decoder 24 is operative, and as will be explained, recovers both the data and the clocking associated with that data applying the data to the left connection of the shift register 12 and the clocking to an input terminal of the multiplexer. The multiplexer, under the control of the interface controller, in turn dependent on the condition at pad C1, disconnects the local clock 16 from the shift register and applies the clocking from decoder 24 to the shift register. As will be discussed in greater detail below, the serial data available at the decoder is then converted to the parallel format in the in the shift register 12 and transferred via cells 11 and 10 to the parallel pads $T_{E1}$ to $T_{E32}$.

The encoder 17 accepts the serial data stream in binary digital (0,1) format at the $\geq 1$ gHz rate and converts it to a three-level code (0,1,2) with the transitions under the control of the clock 16. The advantage of the three-level coding is that it avoids the need for retaining a separate clocking connection to synchronize remote electronics. The possible disadvantage of a reduction in the signal to noise ratio, is usually avoided by the use of adequately high power levels in the optical paths.

Figure 2:
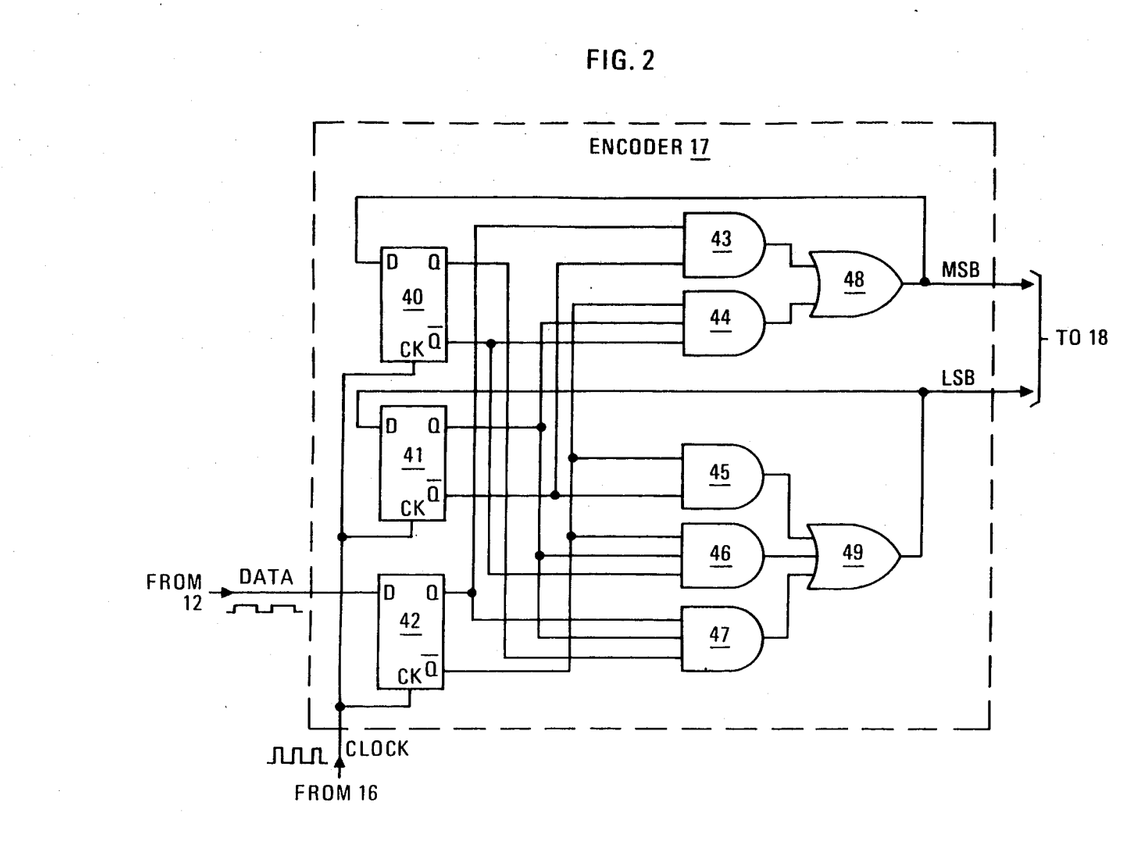
FIG. 2 is a logic diagram of a cell of the monolithic integrated circuit, useful in the multiplex mode of operation, which encodes a serial binary data stream into a three-level code at high bit rates.

The encoder 17 is illustrated in FIG. 2. Its input is a $\geq 1$ gHz serial data stream in a binary digital format supplied from the shift register 12. The output of the encoder appears on two output terminals, one marked MSB (Most Significant Bit) and the other marked LSB (Least Significant Bit), which are coupled to the laser driver 18.

The encoder 17 comprises three flip-flops 40, 41 and 42, five AND gates 43, 44, 45, 46 and 47 and two OR gates 48 and 49 which are interconnected as follows. The serial input data is connected to the D input of the flip-flop 42. The MSB output of the encoder is coupled to the D input of the flip-flop 40 and the output of OR gate 48. The LSB output of the encoder is coupled to the D input of the flip-flop 41 and the output of OR gate 49. The Q output of flip-flop 40 is connected to an input of the three input AND gate 47. The $\overline{Q}$ output of flip-flop 40 is coupled to an input of the three input AND gate 44 and to an input of the three input AND gate 46.

The $\overline{Q}$ output of flip-flop 41 is coupled to an input of AND gate 44, AND gate 46, and AND gate 47. The Q output of flip-flop 41 is coupled to an input of AND gate 43 and to an input of the two input AND gate 45. The Q output of the flip-flop 42 is coupled to an input of the AND gates 47 and 43 The $\overline{Q}$ output of the flip-flop 42 is coupled to an input of AND gates 44, 45 and 46. The outputs of the AND gates 43 and 44 are coupled to the two inputs of the OR gate 48. The output of the OR gate 48 determines the MSB output of the encoder. The outputs of the AND gates 45, 46 and 47 are coupled to the three inputs of the OR gate 49. The output of the OR gate 49 determines the LSB output of the encoder coupled to 18. The flip-flops 40, 41 and 42 of the encoder are clocked by the clock 16.

Figure 4A:
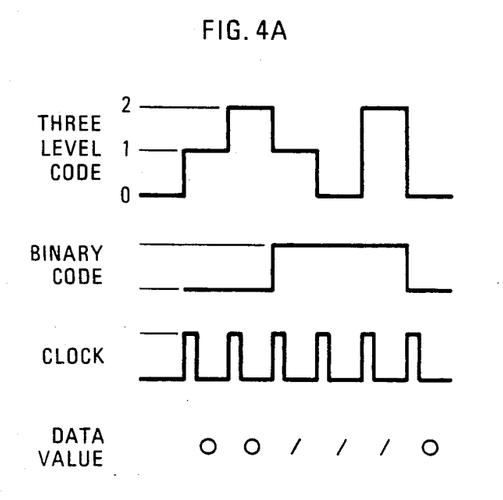
FIGS. 4A and 4B are respectively waveforms and transition diagrams illustrating the three-level code and the binary code, and the relationship between these codes in a stream of digital data.

The three-level code has the format illustrated in FIG. 4A. It is a modulo-three code, whose levels are zero, one and two, used to transmit digital data. The uppermost waveform illustrates a three-level coding of a digital signal for the data value of 0,0,1,1,1,0. The binary coding, assuming no clocking is present, would have the format illustrated in the second waveform from the top in FIG. 4A. Decoding would require a separate clock to supply timing when successive zeros or successive ones occur in the data stream. The three-level code always contains a transition between successive bits, having either a step of one level or a step of two levels.

Figure 4B:
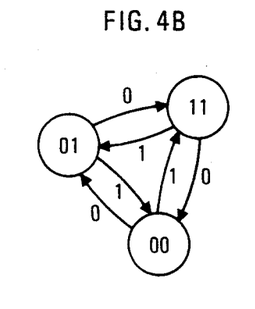

The three-level code may be symbolized by the following expression:

$$S_n = MOD_3[S_{n-1} + X_n + 1] \tag{1}$$

where
$S_n$ is the $n^{th}$ state of the signal
$MOD_3$ is modulo three (0,1,2)
$S_{n-1}$ is the $n-1^{th}$ state of the signal
$X_n$ is the binary value at the $n^{th}$ bit The three-level code may also be symbolized by the diagram illustrated in FIG. 4B. In this diagram, the states 0,0, 0,1 and 1,1 are illustrated within three circles disposed in clockwise order at the apices of a triangle. The arrows interconnecting the states indicate the values assigned to each transition. "Zeros" are assigned to clockwise transitions between 0,1 and 1,1; 1,1 and 0,0; and 0,0 and 0,1. "Ones" are assigned to counterclockwise transitions between 0,0 and 1,1; 1,1 and 0,1; and 0,1 and 0,0.

The encoder logic shown in FIG. 2 couples two successive bits to the decision logic (gates 43–49) which determines whether the incoming digital data has a value of zero or one or two in three-level coding. The stepping, which occurs at the end of each bit permits subsequent recovery of the clocking, even after transitioning to an optical format and back to an electrical format, as illustrated in the second waveform from the bottom of FIG. 4A.

The buffer amplifier 18 accepts the three-level coded data on the MSB and LSB paths and converts it to three analog levels for regulating the current supplied to the laser 19. The buffer amplifier 18 is designed to provide a proper impedance match at the proper power level for direct modulation of the laser by means of the current supplied. The current levels herein contemplated range from under a milliampere to several tens of milliamperes. Since the present multiplexer chip is designed for short distance interconnections, frequently less than a meter and generally less than ten meters, the lower power levels in the cited range are normally quite satisfactory for reasonable signal to noise ratios.

The laser 19 is a diode laser preferably having a ridge waveguide geometry. Suitable structures are described in APPLIED PHYSICS LETTERS 44(3) 1 February 1984 pages 325-327 and in the IEE JOURNAL OF QUANTUM ELECTRONICS Vol. QE-20, No. 2, February 1984 pages 126-130.

An AlGaAs/GaAs short cavity laser, using the ridge construction suggested above, is suitable for monolithic integration into the IC herein described. The optical cavity for the laser utilizes an n+ GaAs active layer, which is bounded top and bottom by an AlGaAs layer and on the sides by an etched trench, leaving a "ridge". One end of the optical cavity is preferably defined by a cleaved surface, a part of the edge of the chip to which the optical output fiber $T_{01}$ may be coupled. The other end of the cavity is defined by "microcleaving" the layers forming the optical cavity (as opposed to cleaving the full subtrate). Microcleaving involves undercutting the laser structure on the substrate and breaking it off along a cleavage plane.

The laser is operated at a bias above the lasing threshold for all three-coded levels. Operation in this manner avoids the time delay between the application of current to a diode laser and the beginning of laser action. The delay typically requires about 2 ns. Avoiding such delays increases the available modulation bandwidth.

The optical fiber $T_{01}$ forms the means for deriving the serial optical output from the integrated circuit. The derivation of the optical output at one end of the optical cavity may be achieved by a direct bond of the optical fiber to the cleft surface of the edge of the substrate. As an alternative to a direct bond, lensing or immersion optics may be used for output derivation. In taking optical energy from the end of the cavity, the reflectivity at the end of the optical resonator must be adjusted to permit both strong lasing and the derivation of an adequate optical output. The fiber may be of a low cost, multimode tolerant, design, which minimizes optical losses in short distance point-to-point optical connections.

The optical signal which is coupled to the output optical fiber $T_{01}$ in the multiplex mode, is a three-level optical signal in the form of a pulse of light on a carrier having the optical frequency of the laser. The pulse repetition rate is set by the 1 gHz clock 17. The three logic levels of the output pulse transmission are set to occur within the linear portion of the laser operating range. The lowest level (as earlier discussed) must be above the level at which lasing is sustained. The second level is set sufficiently high to maintain a good signal to noise ratio. The uppermost level, which is established by the need for symmetry in the transmission and a good signal to noise ratio, is set below the saturation level of the device. Ideally, the levels are equally spaced.

In the demultiplex mode the IC receives a three-level coded optical signal via the optical fiber $T_{02}$, which is coupled to the detector 22.

A detector which is suitable for integration on the integrated circuit and provides gain is an optical field effect transistor (OPFET). The "OPFET" is a form of GaAs MESFET in which incident light is allowed to enter the gate region facilitated by removal of the gate metallization. (Source and drain electroding are retained.) The gate region is configured and doped to optimize the creation of optically induced carriers. The design responds to light which impinges orthogonal to the surface of the device. Assuming that light to be detected is available in optical fiber of circular cross section, the OPFET may be interdigitated in a configuration optimized for illumination having a circular cross section.

Suitable OPFET structures (not interdigitated) are described in APPLIED PHYSICS LETTERS 36(2) 15 January 1980 pages 149-151, and in the IEE TRANSACTIONS ON ELECTRON DEVICES, Vol. ED 28 No. 7, July 1981 pages 841-849.

The OPFET 22 operates with a two to three volt source-drain voltage (suitable for buffered FET logic with a series load resistance forming the load from which the electrical output signal is derived. The structure provides an internal gain of from 5 to 10 and thus is more convenient to use than a gain-free device.

The output of the OPFET is coupled to the multistage amplifier 23 which both elevates the signal to a sufficiently high level to avoid further noise problems, and brings the electrical output to the desired logic levels appropriate for the three-level code. An amplifier gain of 25 to 30 db is typically required.

The three-level coded serial data stream derived from the amplifier 23 is then coupled to the decoder 24 which converts the signal from three-level coding to binary format. The decoder data output is coupled to the serial data input of the shift register 12.

The decoder 24, in the demultiplex mode, recovers clocking from the received bit stream for operation of the converter 12 and for its own operation. The interface controller 13, responds to the setting at pin C1, which controls whether the IC is in a transmit (multiplex) or a receive (demultiplex) mode. In the demultiplex mode under discussion, the multiplexer 15, under the control of the controller 13, disconnects the local clocking 16 from the shift register 12 and connects the clocking derived by the decoder 24 from the received optical data stream to the shift register 12.

The demultiplexed signal appears at the parallel electrical input/output terminals of the register 12, and is coupled via the latch 11 to the input/output terminals $T_{E1}$ to $T_{E32}$ of the integrated circuit. The output of the integrated circuit is clocked at the clock rate recovered from the data optically transmitted to the integrated circuit over the optical fiber $T_{02}$.

Figure 3:
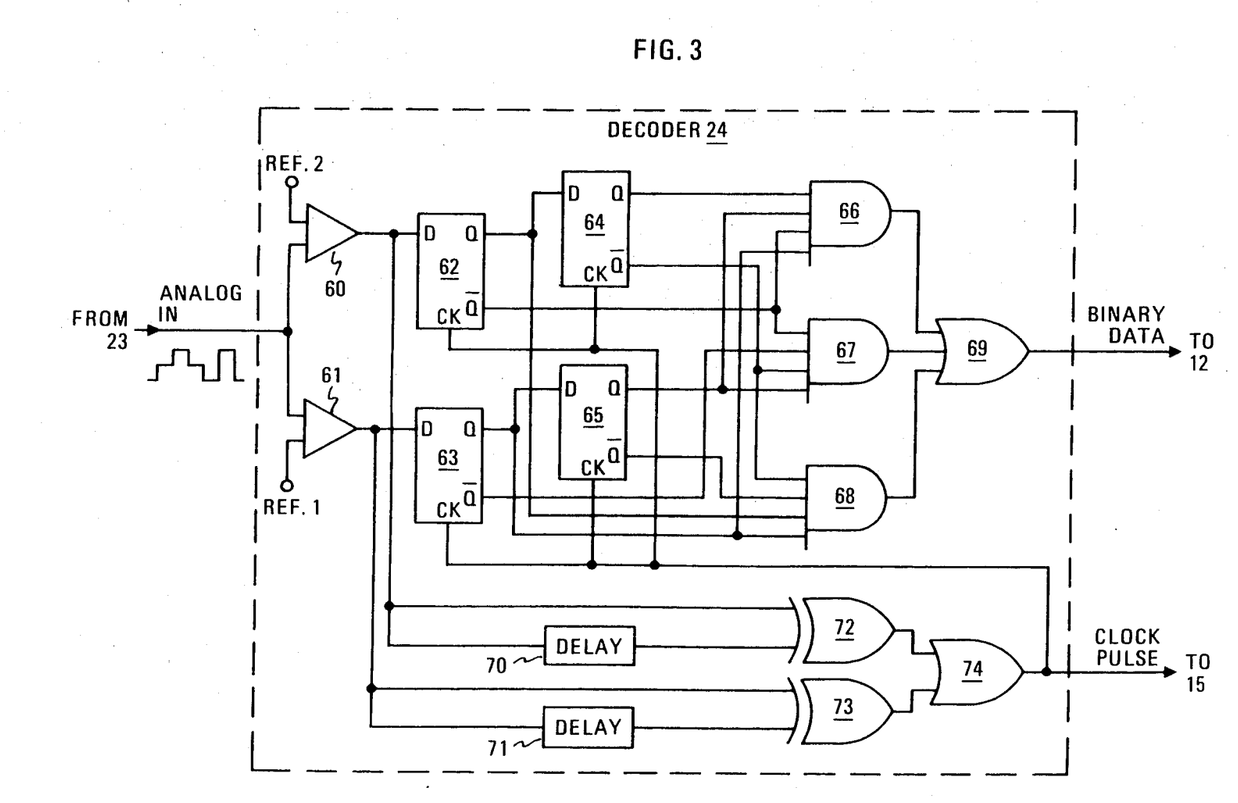
FIG. 3 is a logic diagram of a cell of the monolithically integrated circuit, useful in the demultiplex mode of operation, which decodes a serial data stream in a three-level coded format to a binary format at a high bit rate.

The logical components and circuit of the decoder 24 are illustrated in FIG. 3. The logical components of the decoder comprise two comparators 60 and 61; four flip-flops 62, 63, 64 and 65; three AND gates 66, 67 and 68; and an OR gate 69. The above recited components participate in converting the three level coded serial data stream to a binary format. The decoder recovers the clocking by means of the comparators 60, 61, (also in use in decoding the data); the delays 70, 71; the exclusive-OR gates 72 and 73; and the OR gate 74. The recovered clocking is used to clock the flip-flops 62–65 of the deocder and the shift register 12.

The components of the decoder are connected and operate as follows. The three level signals from the amplifier 23 are coupled to one input terminal of each of the comparators 60, 61. The other input terminal of the comparator 60 is coupled to a reference REF 2 set between the two higher of the three levels. The other input terminal of the comparator 61 is coupled to a reference REF 1 set between the two lower of the three levels. The output of the comparator 60 is coupled to the D input of the flip-flop 62, and the output of the comparator 61 is coupled to the D input of the flip-flop 63. Thus the state of each bit in the bit stream is compared by the comparators 60 and 61 and the value of the bit in one of three possible levels is reflected by the states of the flip-flops 62 and 63. Each flip-flop 62 and 63 is clocked in synchronism with the bit stream by clocking recovered from the bit stream and coupled to their clock terminals Ck.

The state of each bit expressed in the binary format requires a simultaneous response to two successive states of the three level coded signal. These states are reflected by the states of the flip-flops 62-65. The "nth" bit of the serial bit stream which is coupled to the D inputs of 62 and 63 is clocked on the next recovered clock pulse to the Q and $\overline{Q}$ outputs of 62 and 63. The Q output of 62 is coupled to the D input of flip-flop 64, while the Q output of flip-flop 63 is coupled to the D input of flip-flop 65. The Ck terminals of 64 and 65 are also coupled to respond to the recovered clocking. On the next recovered clock pulse, the $n^{th}$ bit is coupled to the Q and $\overline{Q}$ outputs of 64 and 65. Thus once filled, the flip-flops 62-65 at their Q, $\overline{Q}$ outputs reflect two successive states of the bit stream.

The decision logic 66, 67, 68 and 69 recovers the binary values of the bit stream. The decision logic comprises the four input AND gates 66, 67 and 68 and the three input OR gate 69. The Q output of flip-flop 62 is coupled to an input of AND gate 68. The Q output of flip-flop 64 is coupled to an input of AND gate 66. The $\overline{Q}$ output of flip-flop 64 is coupled to an input of AND gates 67 and 68. The $\overline{Q}$ output of flip-flop 62 is coupled to an input of AND gates 66 and 67. The Q output of flip-flop 65 is coupled to an input of AND gates 66 and 67. The $\overline{Q}$ output of flip-flop 65 is coupled to an input of flip-flop 68. The Q output of flip-flop 63 is coupled to an input of AND gates 66 and 68. The $\overline{Q}$ output of flip-flop 63 is coupled to an input of AND gate 67. The outputs of all AND gates 66, 67 and 68 are then coupled respectively to the three inputs of OR gate 69. The output of OR gate 69 contains the bit stream in a binary format.

The clocking is recovered from the bit stream by means of the components 70-74. The output of comparator 60 is coupled directly to one input of exclusive OR gate 72, and through delay 70 to the other input of 72. The output of comparator 61 is coupled directly to one input of exclusive OR gate 73 and through delay 71 to the other input of 73. The outputs of gates 72 and 73 are then coupled to the two inputs of OR gate 74. The timing pulses reflecting each transition of the data stream appear at the output of OR gate 74, and are coupled to the flip-flops 62-65 to control the clocking of the binary bit stream as it proceeds to the data input of the shift register 12, and also proceed to the "MUX" 15, which when set in the demultiplex mode, clock the shift register 12 by the recovered clocking. Thus the data demultiplexed to a parallel format and appearing at the input/output terminals ($T_{E1}$-$T_{E32}$) of the IC are clocked by clocking recovered from the incoming optical bit stream.

The integrated circuit herein described presents a particularly convenient way for transferring large quantities of data from plural electrical paths to a single optical path for simplified transmission from one discrete electrical device to another. Conversely, the integrated circuit, herein described, provides a convenient way for transferring large quantities of data from a single optical transmission path into a plurality of electrical paths.

Viewed from another viewpoint, a pair of the integrated circuits, herein described, and interconnected by two optical fibers may be used to provide the transmission media for pluralities of separate electrical channels spacially separated by distances as little as a fraction of a meter or by as great a distance as may be spanned by the optical fiber transmission technique.

In all applications, the simple optical fiber facilitates the efficient transfer of large quantities of data. Nor need the issue of clocking the data complicate the intrinsic simplicity of a two fiber communication linkage. The use of the three-level code permits the outgoing data, when the IC is in a transmission mode, to be self clocking when it is received by an IC in a reception mode.

The use of a separate fiber for transmission and a separate fiber for reception avoids the need for directional optical couplers on the IC, and thus provides a most convenient way for achieving a bilateral communication path, assuming monolithic integration of each of the communicating electronic devices.

(The selection of the three-level code for optical data transmission has the further advantage that it requires a minimum additional bandwidth to incorporate the clocking into the optical data path.)

The electrical design, herein described to the logical level, by the selection of separate fibers for transmission and reception requires no optical paths between circuit elements on the IC. The only optical paths required are those within the laser 19 and within the optical detector 22. In the laser, the final electrical connection before conversion of the signal from the electrical to the optical state, are the metallizations for the diode adjacent to the optical cavity. The light emitted by the laser on the IC conveniently emerges via a cleaved surface, in one example coincident with the edge of the substrate. In the optical detector 22, the gate region, which is comparatively shallow and which exists between the source and drain electrodes is the medium in which electrical carriers are formed that govern the electrical current between electrodes. The light absorbed by the OPFET enters the top surface of the substrate and need go no further than to enter the gate region.

Thus light transmission within the integrated circuit is limited to the very devices in which the electro-optical conversion takes place and is not further complicated by the act of integration.

The selection of GaAs as a substrate material is essential to the integration of both the electro-optical components and electrical components of good high frequency performance on a single integrated circuit. While another III-V compound semiconductor material has been proposed, which lases, is optically sensitive, and permits devices having good high frequency amplifying properties, no material other than GaAs is developed to the point of practicality for this application.

Furthermore, where the objective is to attain high data transmission rates (in excess of ½ gHz) the GaAs material has an advantage in the design of the digital and analogue electrical devices of being a better high frequency material than silicon. The advantage of GaAs over silicon increases as the bit rates increase into the tens of gHz.

What is claimed is:

1. An IC (integrated circuit) for electro-optical multiplex/demultiplex operation at high data rates comprising:

A. a substrate for the IC of GaAs;

B.
1. a plurality of parallel, electrical, IC input/output terminals on said substrate;
2. a serial, optical IC output port on said substrate adapted to be coupled to a first, output, opticla fiber; and
3. a serial, optical, IC input port on said substrate adapted to be coupled to a second input, optical fiber;

C. an electrical converter for binary data having a parallel to serial multiplex mode, and a serial to parallel demultiplex mode, integrated on said substrate and having parallel input/output terminals for data exchange in both modes coupled to said parallel IC terminals, a serial output terminal for transmission of a serial data stream in the multiplex mode, and a serial input terminal for reception of a seral data stream in the demultiplex mode;

D. an electrical encoder integrated on said substrate, coupled to the serial output terminal of said converter for converting said serial binary output data stream in the multiplex mode to a self-clocking three-level coded format in which each transition defines both a data bit and a clocking instant, requiring a minimum increase in bandwidth in transmitting and decoding both data and clocking over that required for data alone;

E. a diode laser integrated on said substrate forming said optical IC output port, said laser being amplitude modulated in the multiplex mode by said encoder in three levels to transmit a self-clocking serial optical data stream at said high data rate, the biasing of said diode permitting lasing at each level.

F. an electrical clocking oscillator integrated on said substrate having its output coupled to said converter and to said encoder to clock to optical, IC output in the multiplex mode;

G. an opticla detector integrated on said substrate forming said optical, IC input port, consisting of an optical field effect transistor exhibiting gain, said detector in the demulitplex mode converting a received, three-level coded, serial optical data stream to a like coded serial electrical data stream; and H. an electrical decoder integrated on said substrate for converting said detected three-level coded data stream to a digital format, and for recovering the clocking accompanying said received data stream;

said decoded received serial data stream being coupled to said converter serial input terminal and appearing in a parallel format at said converter parallel input/output terminals and at said parallel electrical IC input/output terminals in the demultiplex mode, said IC output data stream being clocked at said recovered clocking rate.

* * * * *